(12) United States Patent
Bovino et al.

(10) Patent No.: US 9,377,617 B2
(45) Date of Patent: Jun. 28, 2016

(54) PLASMONIC PLATE FOR GENERATING OPTICAL VORTICES

(75) Inventors: Fabio A. Bovino, Rome (IT); Matteo Braccini, Rome (IT); Alessio Benedetti, Rome (IT)

(73) Assignee: Selex Sistemi Integrati S.p.A., Rome (IT)

( * ) Notice: Subject to any disclaimer, the term of this patent is extended or adjusted under 35 U.S.C. 154(b) by 945 days.

(21) Appl. No.: 13/560,662

(22) Filed: Jul. 27, 2012

(65) Prior Publication Data

US 2013/0038932 A1 Feb. 14, 2013

(30) Foreign Application Priority Data

Jul. 27, 2011 (IT) .............................. TO2011A0682

(51) Int. Cl.
*G02B 5/30* (2006.01)
*G02B 27/28* (2006.01)
*G02B 26/06* (2006.01)
*G02B 21/32* (2006.01)

(52) U.S. Cl.
CPC .............. *G02B 26/06* (2013.01); *G02B 27/286* (2013.01); *G02B 21/32* (2013.01)

(58) Field of Classification Search
CPC ........ G02B 5/32; G02B 5/008; G02B 5/1809;
G02B 6/0011; G02B 6/0096; G02B 6/26;
G02B 6/268; G02B 6/27; G02B 6/34; G02B
6/1226; G02B 27/28; G02B 27/286; G02B
26/06; G02B 21/32; G02F 2203/10; G02F
2203/16
USPC ............ 359/483.01, 484.01, 486.01–486.03,
359/492.01, 493.01, 558–563, 566, 569,
359/574; 385/1, 129–132, 146–147;
250/493.1, 503.1, 505.1
See application file for complete search history.

(56) References Cited

U.S. PATENT DOCUMENTS

2006/0054793 A1  3/2006 Curtis et al.

OTHER PUBLICATIONS

Gorodetski et al., Observation of the Spin-Based Plasmonic Effect in Nanoscale Structures, Jul. 25, 2008, Physical Review Letters, PRL 101, 043903, pp. 043903-1 through 043903-4.*

* cited by examiner

*Primary Examiner* — Derek S Chapel
(74) *Attorney, Agent, or Firm* — Marshall, Gerstein & Borun LLP

(57) ABSTRACT

A plasmonic plate for generating optical vortices, formed by electrically conducting material and defining a plurality of slots that convert a first electromagnetic field having a non-null spin angular momentum into a second electromagnetic field having a non-null orbital angular momentum.

14 Claims, 8 Drawing Sheets

PLASMONIC PLATE FOR GENERATING OPTICAL VORTICES

CROSS-REFERENCE TO RELATED APPLICATIONS

This application claims the benefit of Italian Patent Application No. TO2011A 000682, filed Jul. 27, 2011.

BACKGROUND OF THE INVENTION

As is known, given an electromagnetic field in space, the location of the points in space where the electromagnetic field has null amplitude defines a so-called phase singularity, also known as phase dislocation. By way of example, various types of phase dislocation are known, such as, for example, screw dislocation, edge dislocation or mixed screw-edge dislocation.

Electromagnetic vortices, also known as so-called optical vortices, are also known. In general, the electromagnetic field defines an optical vortex when it has a dot-like phase singularity, around which the phase of the electromagnetic field itself is wrapped, creating a structure with helical phase fronts. Furthermore, the presence of one or more optical vortices is indicative of the fact that the electromagnetic field defines a location of points in space where it has null amplitude, around which the electromagnetic field assumes a circular symmetry. Therefore, in the case where it defines at least one optical vortex, the electromagnetic field belongs to the category of helical beams, which have a phase profile, or rather a spatial phase distribution, having an angular dependence of the type exp[inθ], where A is an azimuth coordinate and n is a positive or negative integer. For example, the so-called Laguerre-Gauss modes and Bessel-Gauss modes belong to the helical beams category.

That having been said, given an optical vortex defined by the electromagnetic field, this can be characterized by a respective topological charge Q, which is given by the number of revolutions made by the phase of the electromagnetic field around the phase singularity. In other words, indicating the phase of the electromagnetic field as φ, gives:

$$Q = \frac{1}{2\pi}\oint d\phi \quad (1)$$

The topological charge is an integer quantity and can have a positive or negative sign, depending on the phase's direction of circulation.

A non-null angular momentum is always associated with optical vortices, or rather with the corresponding electromagnetic fields that define them.

In particular, it is known that the angular momentum of a generic electromagnetic field is defined as r×π, where r indicates a position vector measured from an origin (for example, centred on a singularity), while π indicates the intensity vector, also known as the Poynting vector. In addition, it is known that it is possible to distinguish two components of angular momentum: a spin angular momentum (SAM), which depends on the polarization of the electromagnetic field, and an orbital angular momentum (OAM), which depends on a transverse distribution of the intensity vector.

In general, each photon of an electromagnetic field with circular polarization has a spin angular momentum alternatively equal to ±ℏ.

Conversely, each photon of an electromagnetic field belonging to the helical beam category, therefore defining a corresponding optical vortex, has an orbital angular momentum per photon equal to ±mℏ, where m is an integer equal to the topological charge of the corresponding optical vortex. Moreover, the presence of a non-null orbital angular momentum implies that the Poynting vector of the corresponding electromagnetic field rotates around the optical vortex; in fact, it is found that it is the azimuthal component of the Poynting vector that generates the component of the orbital angular momentum heading along the direction of propagation.

That having been said, in paraxial approximation, it is possible to express a linearly polarized electromagnetic field as:

$$E(\rho,\theta,z) = u(\rho,\theta) * e^{ikz} * \sigma \quad (2)$$

where σ is the polarization vector, k is the constant of propagation along z and $u(\rho,\theta)$ is the distribution of the electromagnetic field in the transverse plane. Therefore, in a plane z=0, a time-averaged Poynting vector is obtained as follows:

$$\Pi = \frac{\varepsilon_0}{i\omega}[u^*(\rho,\theta)\nabla_T u(\rho,\theta) - c.c] + \frac{2k\varepsilon_0}{\omega}|u(\rho,\theta)|^2 \hat{z} \quad (3)$$

where $\nabla_T$ is the transverse gradient operator, $\varepsilon_0$ is the electric constant, ω is the electromagnetic field pulse and c.c. indicates the complex conjugate. Furthermore, in paraxial approximation, it is possible to consider the position vector r as operating only in the transverse plane; therefore, by indicating the transverse component of the Poynting vector with $p(\rho,\theta)$, it is possible to express the component (per unit length) of the orbital angular momentum heading along the z-axis as:

$$L = \int [r \times p]_z \rho d\rho d\theta = \frac{2\varepsilon_0}{i\omega}\int u^*(\rho,\theta)[r \times \nabla_T]_z u(\rho,\theta) \rho d\rho d\theta \quad (4)$$

By dividing equation (4) by the energy transported by the linearly polarized electromagnetic field, the following is obtained:

$$\ell\hbar = \frac{\int u^*(\rho,\theta)\frac{\hbar}{i}\frac{\partial u(\rho,\theta)}{\partial\theta}\rho d\rho d\theta}{\int |u(\rho,\theta)|^2 \rho d\rho d\theta} \quad (5)$$

In practice, equation (5) represents the orbital angular momentum per photon of a linearly polarized electromagnetic field having a transverse distribution equal to $u(\rho,\theta)$.

Nowadays, electromagnetic fields having non-null orbital angular momentum find application in numerous sectors, such as, for example, particle manipulation by means of so-called optical tweezers, or in the generation of quantum states, or even in soliton generation. Numerous techniques have been proposed for the purposes of generating these electromagnetic fields.

In detail, it is known to generate light beams that transport orbital angular momentum by using so-called fork holograms, which impress a phase profile having an angular dependence of the type exp[in θ] on an electromagnetic field that impinges on them. In practice, a fork hologram has a fringe system, inside which there is branching of the fringes, which is located at a point in which the phase singularity is generated. The topological charge of the thus-generated optical vortex is proportional to the number of branches.

Another technique for generating optical vortices contemplates the use of so-called q-plates, namely birefringent laminae formed from liquid crystals, inside which an azimuthal distribution is generated on the local optical axis. By providing an electromagnetic field having non-null spin angular momentum in input to these q-plates, an electromagnetic field with non-null orbital angular momentum is obtained in output. In other words, the q-plates enable performing a conversion of spin angular momentum into orbital angular momentum.

Furthermore, the patent application US2006/0054793 describes the generation of an electromagnetic field having non null orbital angular momentum by means of a grating, on which a Gaussian beam is caused to impinge, so that this latter is reflected by the grating. The reflected field has a non-null orbital angular momentum and is used to induce the rotation of particles.

Instead, the paper of C. H. Schmitz et al., "Tuning the orbital angular momentum in optical vortex beams", Optics Express, vol. 14, no. 15, 1 Jan. 2006, pag. 6604 describes the generation and combination of two optical beams having orbital angular momentums with opposite signs and phase-shifted with respect to one another. Each of these optical beams is generated by means of a liquid crystal reflecting display, also known as spatial light modulator (SLM). In particular, a collimated beam is caused to impinge onto the spatial light collimator, so that the spatial light collimator acts as a phase mask and generates a corresponding optical beam by reflection.

It is also known to make use of so-called spiral phase plates (SPP). A spiral phase plate, known for short as an SPP, is an optical device made of a transparent material and having a central axis, the thickness of which increases in proportion to the azimuthal angle $\theta$. By way of example, an SPP is shown in FIG. 1, where it is indicated by reference numeral 1.

In practice, when a light beam crosses the SPP 1, each ray of the light beam travels over an optical path, the length of which linearly depends on its azimuth coordinate. Therefore, when an electromagnetic field passes through it, the SPP 1 impresses a helical phase profile on the electromagnetic field, thus generating an optical vortex.

In particular, SPPs are known of that, when crossed by a Hermite-Gauss mode, provide a variable-order Laguerre-Gauss mode in output.

Independently of the constructional details, known types of SPPs have diameters of the order of a centimeter and are made from a plastic material, such as ethylene glycol dimethacrylate for example. Furthermore, they can be manufactured by means of moulding operations, using specially provided dies. They are therefore subject to aging of the plastic material, which causes a drop in performance. In addition, in the case where electromagnetic fields with high energy density impinge on the SPPs, they can deform, as the plastic material heats up when absorbing the energy.

SUMMARY OF THE INVENTION

The object of the present invention is to provide a plasmonic plate that at least partially resolves the drawbacks of the known art.

According to the invention, a plasmonic plate, a plasmon generator, a use of a plasmonic plate and a method of generating an optical vortex are provided, as defined in claims 1, 10, 12 and 13, respectively.

BRIEF DESCRIPTION OF THE DRAWINGS

For a better understanding of the invention, some embodiments will now be described, purely by way of non-limitative example and with reference to the attached drawings, where.

DETAILED DESCRIPTION OF THE INVENTION

Figure 1:
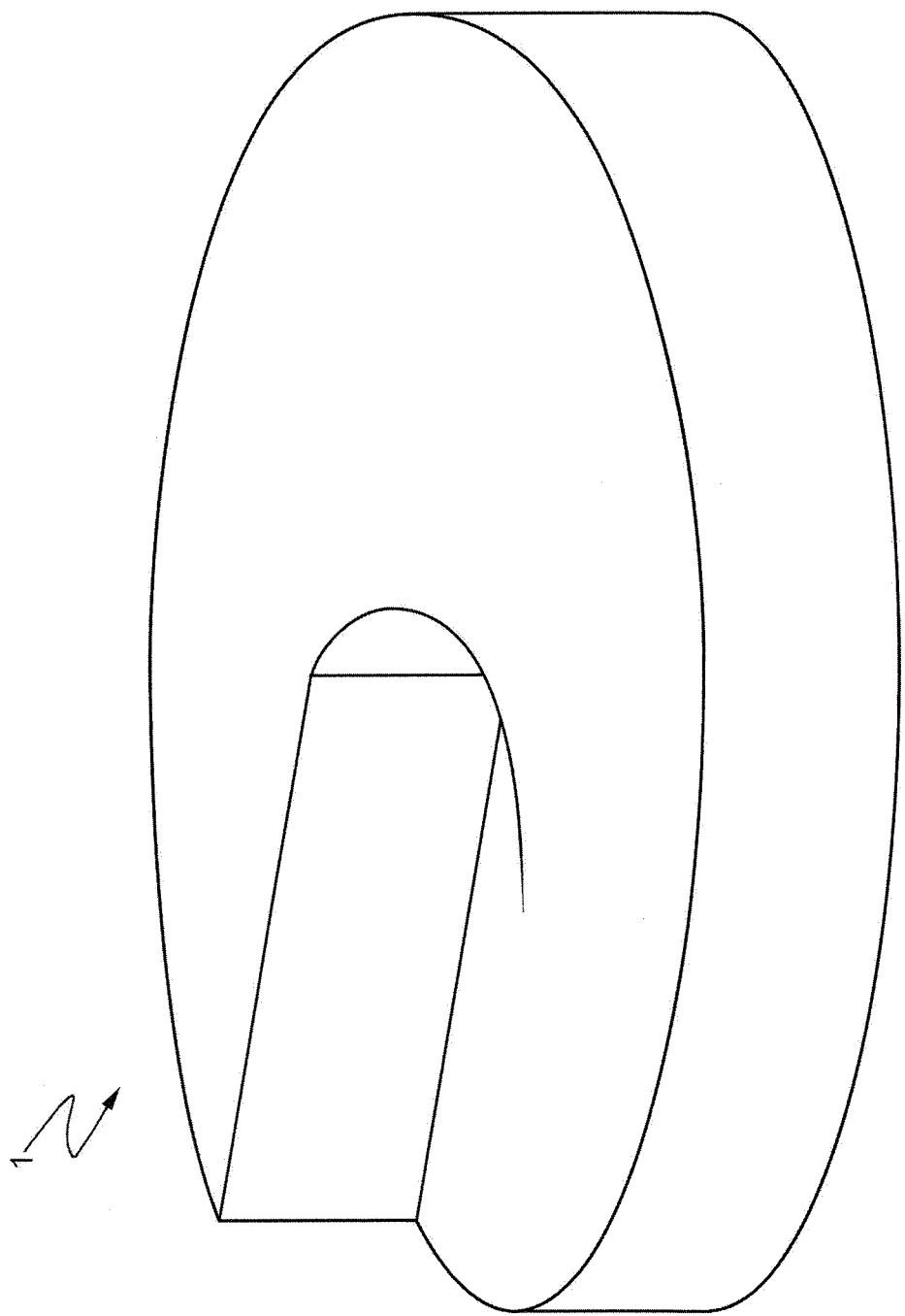
FIG. 1 shows a perspective view of an SPP of known type.
Figure 2:
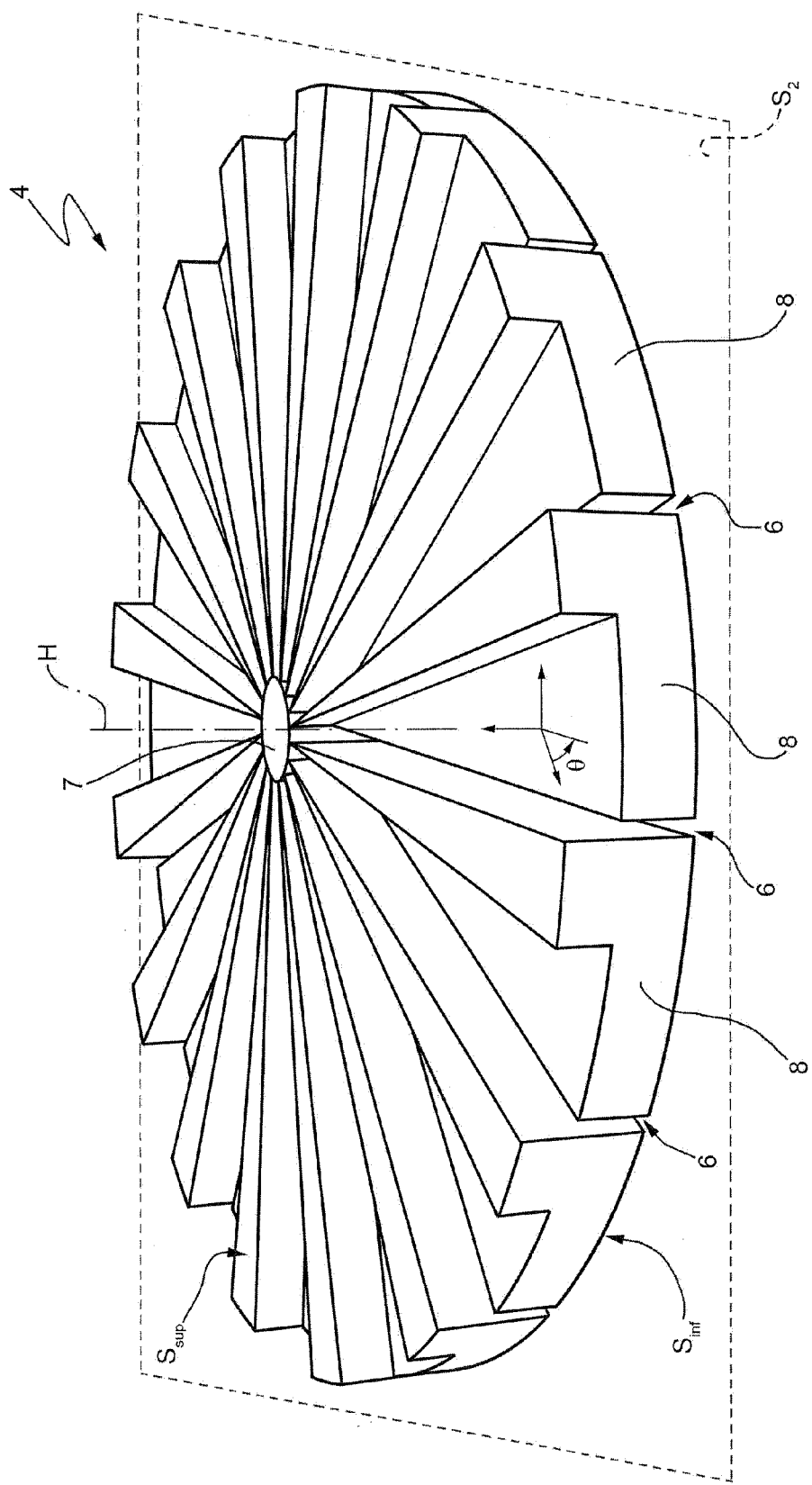
FIG. 2 shows a perspective view of a plasmonic plate according to the present invention.
Figure 3:
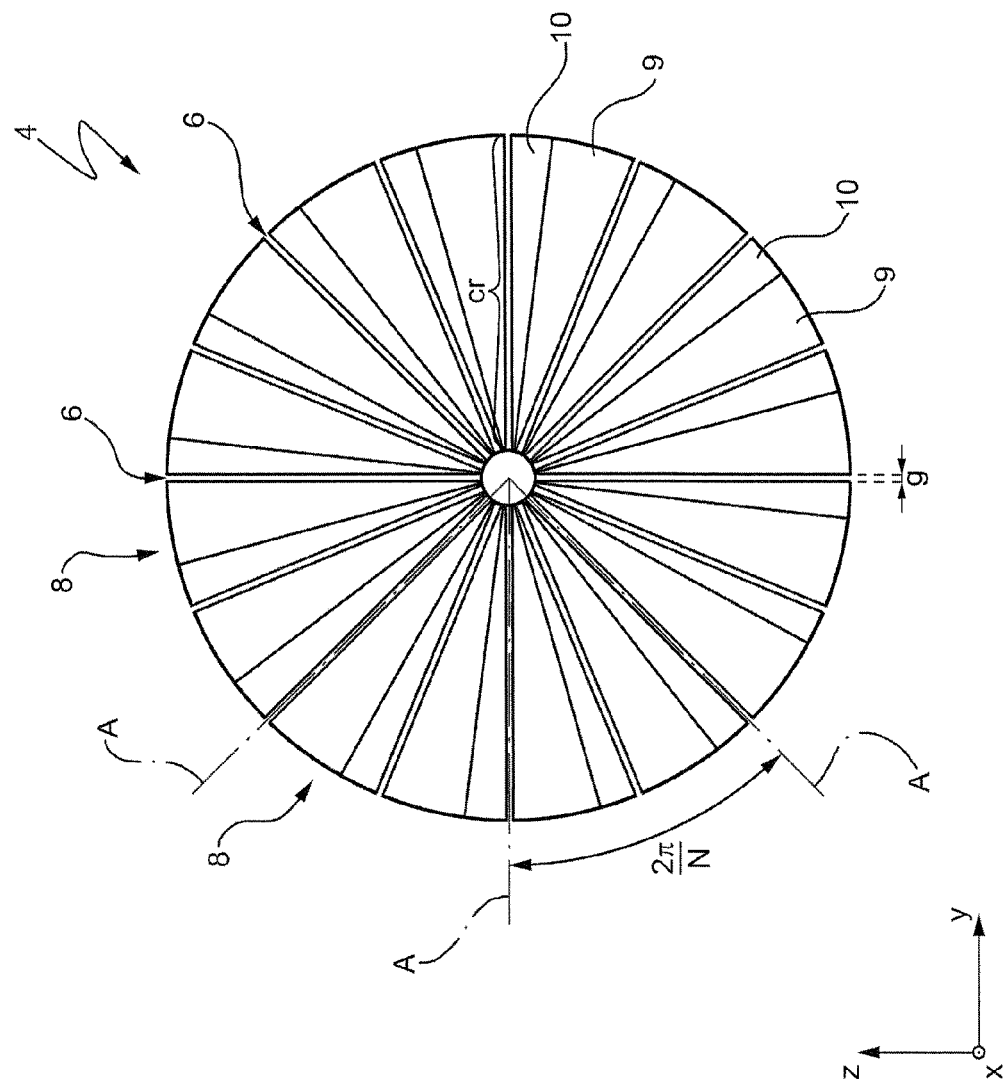
FIG. 3 shows a top view of the plasmonic plate shown in FIG. 2.

FIGS. 2 and 3 show a plasmonic plate suitable for receiving a first electromagnetic field having non-null spin angular momentum and generating, in response, a second electromagnetic field having non-null orbital angular momentum, which for brevity shall henceforth be referred to as the plate 4.

In detail, the plate 4 is made of an electrically conducting material such as, as an example, a metal (for example, silver or gold), defines a number N (for example, N=16) of slots 6 and, when viewed from above, has a circular shape.

More specifically, the plate 4 has a symmetry axis H, defines a lower plane $S_2$, perpendicular to the symmetry axis H, and is formed by a central shield 7 and a plurality of elementary units 8 equal to one another and arranged around the central shield 7 in a non-contiguous manner, so as to define the above-mentioned slots 6, which are identical to one another, i.e. they have the same shape, as described further on.

The central shield 7 has a cylindrical shape of radius D (FIG. 4), for example, equal to 500 nm. In addition, each elementary unit 8, when viewed from above, has the shape of a circular sector and has a lower surface $S_8$ (FIG. 4), which is flat, lies on the lower plane $S_2$ and also has a circular sector shape. In practice, the lower surfaces $S_8$ of the elementary units 8, taken as a whole, define a flat surface of the plate 4, indicated as $S_{inf}$.

Figure 4:
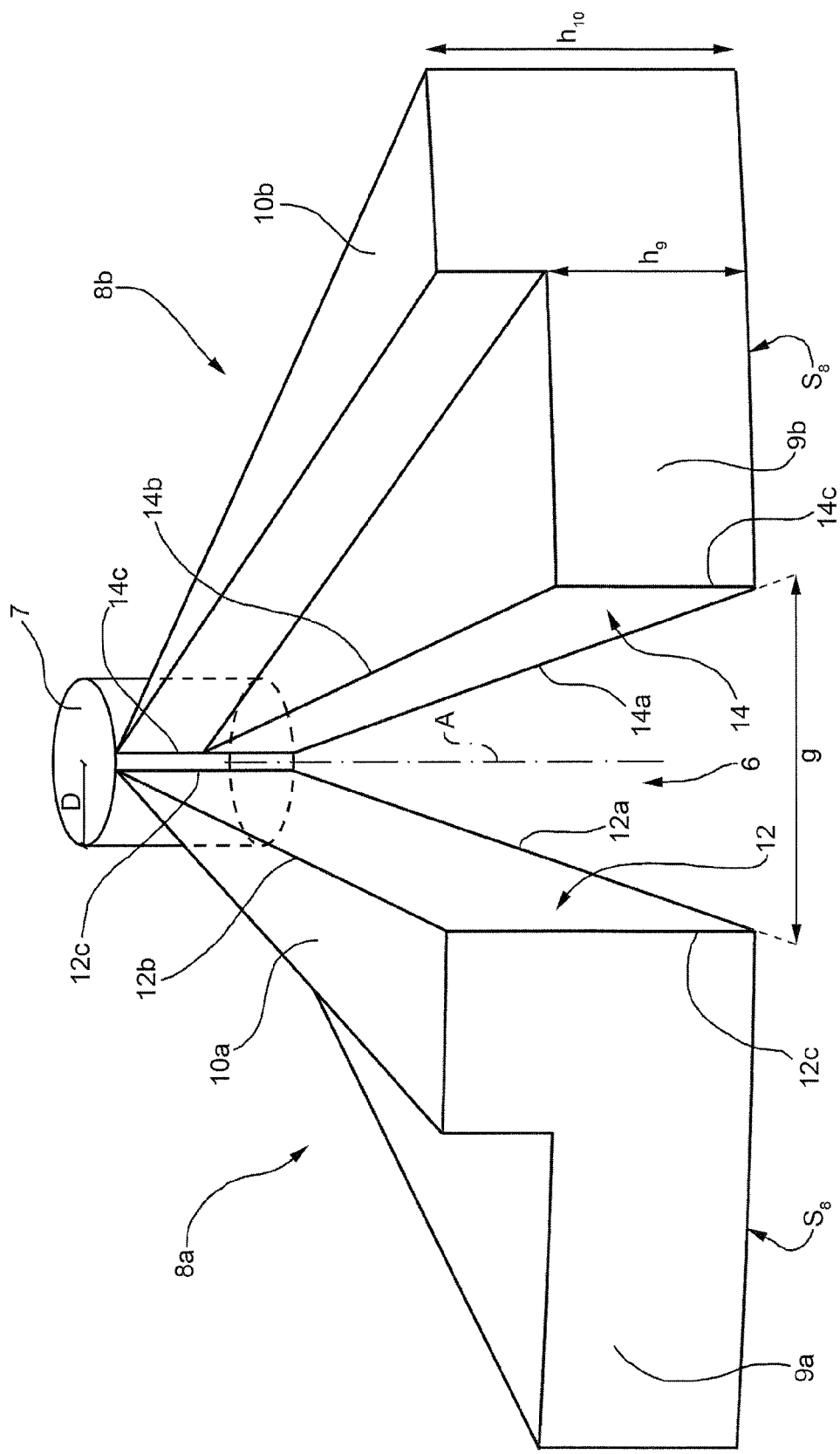
FIG. 4 shows a perspective view of a portion of the plasmonic plate shown in FIGS. 2 and 3.

As shown in greater detail in FIGS. 3 and 4, each elementary unit 8 is formed by a first and a second portion 9, 10, integral with each another and also having, when viewed from above, a circular sector shape. In particular, considering any one of the elementary units 8, the respective first and second portions 9, 10 both have the shape of a cylindrical segment, i.e. they have the shape of a prism having a base with a circular sector of radius cr; for example, cr could be equal to a few tens of micrometers. Furthermore, the first and second portions 9, 10 extend vertically from the lower plane $S_2$ with heights equal to $h_9$ and $h_{10}$, respectively, both in the order of tens or hundreds of nanometers and with $h_9 < h_{10}$; in practice, the first portions 9 and second portions 10 of the elementary units 8 define a corrugated surface of the plate 4, indicated as a whole by $S_{sup}$. In general, the overall diameter D+cr of the plate 4 is less than 100 µm; in addition, heights $h_9$ and $h_{10}$ are at most equal to 300 nm and 500 nm, respectively.

As shown in FIG. 3 in particular, the elementary units 8 are arranged around the central shield 7 in a manner such that, ignoring the curvature of the central shield 7, the slots 6 have a rectangular shape when viewed from above. Furthermore, as shown in FIG. 4 in particular, by considering two adjacent elementary units, it can be seen that these define a corresponding slot 6. In regard to this, FIG. 4 shows precisely a first and second elementary unit, indicated here as 8a and 8b, adjacent to each other.

The first elementary unit 8a comprises a respective first portion and a respective second portion, indicated here as 9a and 10a; in addition, the second elementary unit 8b comprises a respective first portion and a respective second portion, indicated here as 9b and 10b.

The second portion 10a of the first elementary unit 8a defines a first slot surface 12, having a rectangular shape and perpendicular with respect to the lower plane $S_2$. Similarly, the first portion 9b of the second elementary unit 8b defines a second slot surface 14, this also having a rectangular shape, perpendicular with respect to the lower plane $S_2$ and facing the first slot surface 12, from which it is set apart at a distance g, this distance g being of the order of a few tens of nanometers and, in any case, less than 100 nm. Therefore, the first and second slot surfaces 12, 14 are parallel to each other and laterally delimit the slot 6 interposed between the first and second elementary units 8a, 8b.

More in detail, and still with reference to FIG. 4, the first slot surface 12 is in turn delimited by a first lower edge 12a lying on the lower plane $S_2$, by a first upper edge 12b parallel to the first lower edge 12a and by two first lateral edges 12c, perpendicular to the first lower edge 12a and the first upper edge 12b and having a length equal to $h_{10}$. One of the two first lateral edges 12c is arranged in contact with the outer wall of the central shield 7.

The second slot surface 14 is delimited by a second lower edge 14a lying on the lower plane $S_2$, by a second upper edge 14b parallel to the second lower edge 14a and by two second lateral edges 14c, perpendicular to the second lower edge 14a and the second upper edge 14b and having a length equal to $h_9$. One of the two second lateral edges 14c is arranged in contact with the outer wall of the central shield 7.

Between the first and second elementary units 8a, 8b it is therefore possible to define a slot axis A, perpendicular to the symmetry axis H, lying on the lower plane $S_2$ and equidistant from the first and second lower edges 12a, 14a. The first and second slot surfaces 12, 14 are parallel to the slot axis A and therefore the slot 6 extends radially with respect to the symmetry axis H.

In practice, the elementary units 8 are such that each slot 6 has a width equal to g and a length equal to cr. Furthermore, the slots 6 are imbalanced, i.e. each one of them is laterally delimited by two corresponding flat surfaces (the first and second slot surfaces 12, 14) that extend from a same plane (the lower plane $S_2$), but have different heights. Therefore, each slot 6 is delimited by two corresponding portions of the plate 4 having different thicknesses.

As shown in greater detail in FIG. 3, the slots 6 are also angularly and equally spaced apart, i.e. the slot axes A form identical angles. More specifically, given any pair of adjacent slots 6, the respective slot axes A form an angle θ equal to $2\pi/N$. The slots 6 are therefore azimuthally equally spaced apart and define a kind of azimuthal distribution of the slot, with spacing equal to $2\pi/N$. For reasons of completeness, in the present description, the adjective "azimuthal" hereinafter refers to a hypothetical cylindrical coordinate system (FIG. 2) centred along the symmetry axis H, and where the azimuth coordinate is measured in a plane parallel to the lower plane $S_2$. It is therefore possible to associate a corresponding azimuth coordinate with each slot axis A, and hence with each slot; in particular, by using an index j=1, ..., N to indicate the slots 6, the j-th slot will have an azimuth coordinate equal to $\theta_j = 2\pi*(j-1)/N$.

Since they are identical and are distributed around the symmetry axis H, the slots 6 all have a same direction of imbalance, i.e. considering a generic slot 6, an imaginary plane that connects the first and second upper edges 12b, 14b is always found in a same reciprocal position with respect to the corresponding slot axis A, whatever the slot considered. In other words, once the above-mentioned cylindrical coordinate system is set, given any first slot surface 12, it will always have an azimuth coordinate lower (or greater, according to the orientation of the cylindrical coordinate system) than the azimuth coordinate of the corresponding second slot surface 14.

Operationally, as previously mentioned, the plate 4 is suitable for receiving a first electromagnetic field $E_1$ having a wavelength λ and a propagation vector parallel to the symmetry axis H, hence parallel to the first slot surfaces 12 and the second slot surfaces 14, and generating N basic electromagnetic fields in output from the slots 6, these basic electromagnetic fields forming, as a whole, a second electromagnetic field $E_2$, the transverse Poynting vector (i.e. the component of the Poynting vector parallel to the lower plane $S_2$) of which, rotates around the symmetry axis H. Therefore, the second electromagnetic field $E_2$ has a non-null orbital angular momentum.

On the assumption that the plate 4 is immersed in air, the principle of operation of the plate 4 is based on the coupling between surface plasmons (surface plasmon polaritons, also called plasmons) and air, this phenomenon enabling, in a sense, the propagation of the first electromagnetic field $E_1$ though the plate 4 and the consequent generation of the second electromagnetic field $E_2$.

In greater detail, it is known that surface plasmons are electromagnetic modes that propagate at the interface between a dielectric and a metal and which are confined in a direction perpendicular to the surface of the metal. In practice, assuming that the metal is formed by an electron gas, the generation of surface plasmons can be interpreted as deriving from the coupling between an electromagnetic field and oscillations of the electron plasma in the metal.

Assuming a first reference system xyz, formed by three orthogonal axes x, y and z, and assuming having a metal-dielectric interface lying on the plane z=0, the surface plasmons propagate along the x-axis and are limited in an evanescent mode along the z-axis; in addition, the surface plasmons do not exhibit variations along the y-axis. It is therefore possible to express the electromagnetic field associated with a generic surface plasmon as:

$$E(x,y,z) = E(z)e^{i\beta x} \quad (6)$$

where β is the constant of propagation of the plasmon, i.e. the component of the wave vector in the direction of propagation (the x-axis).

By substituting equation (6) in the Helmholtz equation and applying the continuity conditions of the electromagnetic field to the metal-dielectric interface, it is found that the surface plasmon can only propagate if TM polarized (TM—transverse magnetic), i.e. only if the non-null components are $H_y$, $E_x$ and E. Furthermore, it is found that in order to enable surface plasmon propagation, it is necessary that the metal and dielectric have dielectric permittivities where the real parts have opposite signs. In connection with this, as a rule, it is found that with regard to the metal, $Re[\in]<0$; always with regard to the metal, it is found that, on the basis of the Drude model regarding an electron plasma, the dielectric permittivity assumes the following frequency development:

$$\varepsilon(\omega) = 1 - \frac{\omega_p^2}{\omega^2 + i\gamma\omega} \quad (7)$$

where $\omega_p$ is the metal's plasma frequency, while $\gamma$ is the electron collision frequency.

It is therefore possible to derive the following dispersion relation for surface plasmons that propagate along the metal-dielectric interface:

$$\beta = k_0 \sqrt{\frac{\varepsilon_1 \varepsilon_2}{\varepsilon_1 + \varepsilon_2}} \quad (8)$$

where $\varepsilon_1$ and $\varepsilon_2$ indicate the dielectric permittivities of the metal and the dielectric, respectively.

Since, in the case of real metals, the dielectric permittivity $\varepsilon_1$ also possesses an imaginary part, the constant of propagation $\beta$ is complex. This means that the surface plasmons that propagate along the metal-dielectric interface diminish. In order to take into account this attenuation, it is possible to define a length of propagation $L=(2\text{Im}[\beta])^{-1}$, which is normally between 10 μm and 100 μm in the visible spectrum.

As is known, the following relation holds between the constant of propagation $\beta$ and component $k_z$ of the wave vector, i.e. the component of the wave vector parallel to the z-axis:

$$k_z = \sqrt{\beta^2 - \varepsilon_2 \left(\frac{\omega}{c}\right)^2} \quad (9)$$

It is thus found that the confinement of surface plasmons depends on the length of propagation L: the smaller the length of propagation L, the greater the confinement. Therefore, in the case where the constant of propagation $\beta$ assumes high values, high confinement of surface plasmons is obtained. In these conditions, the surface plasmons tend to propagate with a characteristic pulse $\omega_{sp}$ equal to:

$$\omega_{sp} = \frac{\omega_p}{\sqrt{1 + \varepsilon_2}} \quad (10)$$

In the case of so-called multilayer structures, each formed by a dielectric layer interposed between two semi-infinite metal bodies, two metal-dielectric interfaces are present. In this case, the surface plasmons of each of the two metal-dielectric interfaces can interact, giving rise to coupling modes. The following dispersion relations therefore hold:

$$\tanh(k_1 a) = -\frac{k_2 \varepsilon_1}{k_1 \varepsilon_2} \quad (11)$$

$$\tanh(k_1 a) = -\frac{k_1 \varepsilon_2}{k_2 \varepsilon_1} \quad (12)$$

where a indicates the thickness of the dielectric layer, $\varepsilon_1$ and $\varepsilon_2$ respectively indicate the dielectric permittivity of the metal and of the dielectric, and $k_1$ and $k_2$ respectively indicate the constants of propagation in the metal and in the dielectric ($k_i^2 = \beta^2 - k_0^2 \varepsilon_i$, with i=1,2). Furthermore, relation (11) holds for the so-called even-order modes, while relation (12) holds for the so-called odd-order modes.

It is therefore possible to verify that the fundamental odd mode does not exhibit any cutoff as the thickness of the dielectric layer diminishes. It is therefore possible to obtain high values for the constant of propagation $\beta$, and hence high confinements of the surface plasmons, even for frequencies much lower than the metal's plasma frequency $\omega_{sp}$, provided that the thickness of the dielectric layer is sufficiently small. Therefore, it is also possible to obtain high confinements for excitation frequencies in the infrared range.

In particular, as previously described, confinement can be obtained by setting the constant of propagation $\beta$ so that it is greater than the wave vector in the dielectric, such that the surface plasmon is evanescent beyond the surface of the metal, i.e. it decays exponentially. Alternatively, it is possible to excite surface plasmons through a periodic corrugation of the metal-dielectric interface (or interfaces, in the case of multilayer structure), in order to adapt the phase of a radiation incident on the metal-dielectric interface with the phase of the surface plasmon excited by this incident radiation. In particular, the phase adaptation condition is represented by:

$$\beta = k \sin \theta \pm \nu \eta \quad (13)$$

where $\nu$ is an integer index, while $\eta$ is the inverse of the period of the periodic corrugation, k is the modulus of the wave vector of the incident field and $\theta$ is the angle of incidence.

Similarly, it is possible to irradiate an electromagnetic field in the dielectric, by coupling a surface plasmon with this electromagnetic field. This coupling is also obtained thanks to the periodic corrugation.

In a similar manner, it is possible to excite a surface plasmon thanks to the presence of scattering elements in the metal, such as edges or roughness for example. In this case, phase adaptation is guaranteed by an additional moment $\Delta k_x$ due to the scattering caused by the scattering elements. The phase adaptation condition therefore becomes:

$$\beta = k \sin \theta \pm \Delta k_x \quad (14)$$

That having been said, the plate 4 makes use precisely of the electromagnetic field-plasmon coupling mechanism through the use of scattering elements, as well as the phenomenon by which, in a multilayer structure, the fundamental odd mode propagates whatever the thickness of the dielectric layer, in order to achieve the transmission of an electromagnetic field through slots having dimensions smaller than the wavelength of this electromagnetic field.

In detail, it is possible to assume that the first electromagnetic field $E_1$, as previously mentioned, impinges on the flat surface $S_{inf}$ of the plate 4, propagating parallel to the symmetry axis H; put in other words, the first electromagnetic field $E_1$ impinges on a first side of the plate 4. In this way, given a generic slot 6, the first electromagnetic field $E_1$ first encounters the first and second lower edges 12a, 14a, and subsequently the first and second upper edges 12b, 14b. In addition, the first electromagnetic field $E_1$ can, for example, have a wavelength equal to 800 nm.

The first and second lower edges 12a, 14a of each slot 6 act as scattering elements, or rather they induce scattering, serving as surface plasmon generators. In this way, although the heights $h_9$ and $h_{10}$ of the first portions 9 and the second portions 10 of the elementary units 8 are not sufficiently small to allow the first electromagnetic field $E_1$ to pass through the plate 4 due to the tunnel effect, surface plasmons are triggered within the slots 6. In particular, the surface plasmons propagate along the first slot surfaces 12 and the second slot surfaces 14. In addition, as described in greater detail further on, if the distance g between the first slot surfaces 12 and the second slot surfaces 14 is not excessive, namely less than the decay length along the z-axis, the surface plasmons on the first and second slot surfaces 12, 14 of each slot 6 couple and propagate with a same constant of propagation β. On the other hand, the interaction of the first electromagnetic field $E_1$ with the first and second lower edges 12a, 14a also causes the generation of surface plasmons, which propagate horizontally along the lower surfaces $S_8$ of the elementary units 8.

Given a generic slot 6, when the surface plasmons reach the corresponding first and second upper edges 12b, 14b, the latter induce scattering, causing the coupling of the surface plasmons with the corresponding basic electromagnetic field generated by the slot 6 and then with the above-mentioned second electromagnetic field $E_2$. Electromagnetic radiation emissions from the plate 4 then take place. Furthermore, a part of the surface plasmons is reflected by the first and second upper edges 12b, 14b. In consequence, the surface plasmons undergo a series of multiple reflections, travelling forwards and backwards on the first and second slot surfaces 12, 14. In addition, the first and second upper edges 12b, 14b induce the generation of surface plasmons that propagate horizontally and perpendicularly with respect to the first lateral edges 12c and the second lateral edges 14c.

In greater detail, given a generic slot 6, and given a first and a second surface plasmon that propagate from the first and the second lower edges 12a, 14a, respectively, along the first and second slot surfaces 12, 14, respectively, the first surface plasmon is irradiated by the first upper edge 12b after having travelled over a longer path with respect to the path followed by the second surface plasmon, which is irradiated by the second upper edge 14b. In particular, the difference between the paths travelled by the first and second surface plasmons is equal to the difference between heights $h_{10}$ and $h_9$. Moreover, after being propagated and coupled to the second surface plasmon along the path equal to height $h_9$, the first surface plasmon continues to propagate along a path equal to $h_{10}$–$h_9$, and uncoupled from the second surface plasmon, i.e. as if it found itself in conditions of the single metal-dielectric interface. Therefore, by defining the second slot surface 14 and a portion of the first slot surface 12 extending from the lower plane $S_2$ and having a height equal to $h_9$ as a common section of the slot 6, the first and second surface plasmons propagate coupled together in the common section with a common constant of propagation β. Vice versa, by defining the portion of the first slot surface 12 complementary to the portion of the first slot surface 12 belonging to the common section as the remaining section, in this remaining section the first surface plasmon propagates with a constant of propagation $k_{sp}$ typical of a single metal-dielectric interface. The effects due to the multiple reflections of the first and second surface plasmons inside the slot can thus be ignored, as the phase shift between the first and the second surface plasmons is mainly due to this constant of propagation $k_{sp}$ which characterizes the propagation of the first surface plasmon when uncoupled from the second surface plasmons.

In practice, a first component of the basic electromagnetic field is emitted near the first upper edge 12b, having a phase delay equal to $k_{sp}*(h_{10}-h_9)$ with respect to a second component of the basic electromagnetic field, emitted by the second upper edge 14b. It is therefore possible to model the first and the second upper edges 12b, 14b of the slot 6 as a linear distribution of pairs of dot-like sources phase shifted one from the other by $k_{sp}*(h_{10}-h_9)$.

Figure 5:
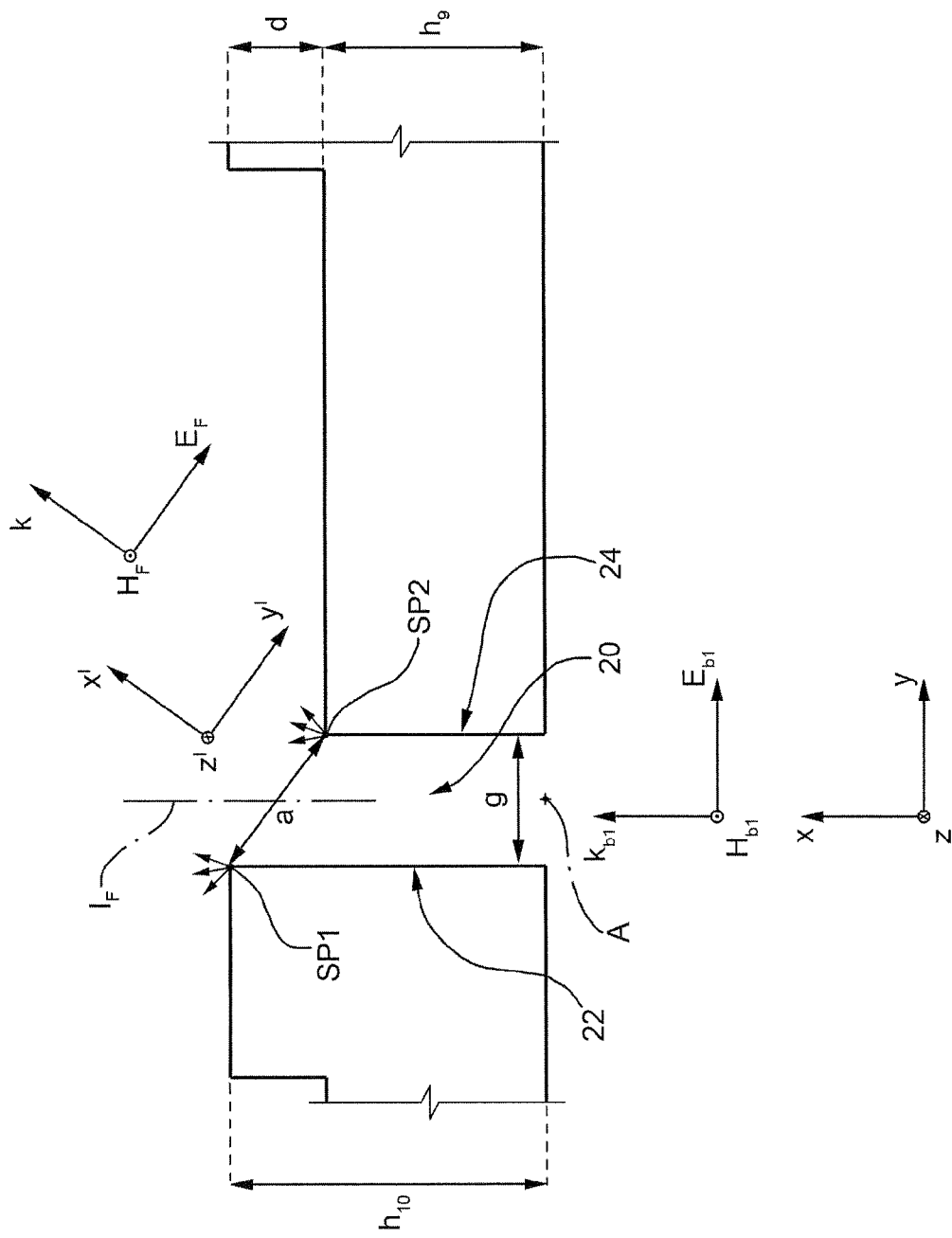
FIG. 5 schematically shows a slot in two-dimensional geometry.

More in detail, in only two dimensions, the basic electromagnetic field emitted by a slot 6 can be determined by means of the co-called Fresnel-Kirchhoff integral. An example regarding two-dimensional geometry is shown in FIG. 5, where a two-dimensional imbalanced slot 20 is shown, having a width g and laterally delimited by a first and a second side 22, 24, parallel to each other and having lengths equal to $h_{10}$ and $h_9$, respectively. In FIG. 5, a first reference system xyz is also shown, with respect to which the two-dimensional imbalanced slot 20 is arranged in a manner such that the first and second sides 22, 24 are parallel to the x-axis.

In greater detail, in order to excite the surface plasmons, the two-dimensional imbalanced slot 20 must be excited with a TM electromagnetic field, having a wave vector $k_{b1}$ and the electric and magnetic components of which are respectively indicated as $E_{b1}$ and $H_{b1}$. Therefore, the electric field $E_{b1}$ is perpendicular to the first and second sides 22, 24 of the two-dimensional imbalanced slot 20.

Furthermore, assuming the presence of a first and a second dot-like source SP1, SP2 respectively arranged at the upper vertex (with respect to the direction of the x-axis) of the first side 22 and on the upper vertex of the second side 24, and such that the first dot-like source SP1 emits electromagnetic radiation with a phase delay equal to $k_{sp}*(h_{10}-h_9)$ with respect to the electromagnetic radiation emitted by the second dot-like source SP, it is possible to express the electric component $E_F$ of the electromagnetic field emitted by the two-dimensional imbalanced slot 20 as:

$$E_F \propto \frac{1}{i\lambda} \int\int \frac{e^{ikr'}}{r'} \delta(z') \left[\delta\left(y' + \frac{a}{2}\right)e^{ik_{sp}d} + \delta\left(y' - \frac{a}{2}\right)\right] dy'dz' \quad (15)$$

where d indicates a difference in height equal to $h_{10}-h_9$, k is the wave vector of the electric field emitted by the two-dimensional imbalanced slot 20, r' is a radial coordinate and $a=\sqrt{g^2+d^2}$ is the distance between the first and second dot-like sources SP1, SP2. In addition, x', y', and z' respectively indicate three orthogonal axes of a second reference system x'y'z', which is related to the two-dimensional imbalanced slot 20 and is rotated with respect to the first reference system xyz such that the y' axis is oriented along the direction that connects the first and second dot-like sources SP1, SP2. In other words, to align the second reference system x'y'z' to the first reference system xyz, it is necessary to rotate the second reference system x'y'z' around the z' axis by an angle φ=arcsin (d/a).

It is also found that the magnetic component $H_F$ of the electromagnetic field emitted by the two-dimensional imbalanced slot 20 is oriented along the z-axis, i.e. the electromagnetic field emitted by the imbalanced slot has TM polarization. Furthermore, by considering far-field conditions and therefore using the so-called Fraunhofer approximation, equation (15) becomes:

$$E_F \propto \frac{2e^{ik_0\left(x' + \frac{y'^2+z'^2}{2x'}\right)+i\frac{k_{sp}d}{2}}}{i\lambda x'} \cos\left(\frac{\pi y'a}{\lambda x'} - \frac{k_{sp}d}{2}\right) \quad (16)$$

where $k_0$ is the constant of propagation in air.

It can thus be verified that electromagnetic field emitted by the two-dimensional imbalanced slot 20 has a wave vector inclined with respect to that of the incident field, as well as with respect to a hypothetical axis $I_F$ of the two-dimensional imbalanced slot 20. In addition, the deflection is proportional to the ratio a/d, and therefore depends on the width g of the two-dimensional imbalanced slot 20 and the difference in height d.

In the case of a single three-dimensional slot, and with the simplified assumption that this single three-dimensional slot extends infinitely along the z-axis, it is possible to extend equation (16) by considering that the field profile it provides remains identical for any value of z.

Again, with reference to the plate 4, the slots 6 thus serve as electromagnetic radiation sources, mutually arranged at a fixed angular distance. In order to excite these electromagnetic radiation sources, each slot 6 is illuminated with a respective electromagnetic field of excitation having TM polarization, the electric field of which is oriented orthogonally with respect to the first and second slot surfaces 12, 14. In principle, in order that this condition is satisfied for all N slots 6 of the plate 4, it is sufficient that the first electromagnetic field $E_1$ alternatively has azimuthal polarization, namely direct, local and orthogonal to the first slot surfaces 12 and the second slot surfaces 14, or circular polarization. However, in order to ensure that the phase of the second electromagnetic field $E_2$ has a helical path, and therefore that the second electromagnetic field $E_2$ has a non-null orbital angular momentum, it is necessary to introduce a constant phase shift between one electromagnetic radiation source and the next. Furthermore, this constant phase shift must be equal to $2\pi/N$, such that along the azimuthal distribution of the N electromagnetic radiation sources, altogether the phase varies, in a discrete manner, from 0 to $2\pi$. For practical purposes, it is therefore preferable that the first electromagnetic field $E_1$ has circular polarization (left or right), so as to illuminate each slot 6 with a delay equal to $2\pi/N$ with respect to the previous slot.

That having been said, the second electromagnetic field $E_2$ emitted as a whole by the plate 4 can be determined on the basis of equation (16), by summing the basic electromagnetic fields emitted by the slots 6. To this end, still referring to the angles $\varphi = \arcsin(d/a)$ and $\theta_i = 2\pi \cdot i/N$, a first and a second rotation matrix can be defined:

$$\begin{pmatrix} \cos\varphi & -\sin\varphi \\ \sin\varphi & \cos\varphi \end{pmatrix} \begin{pmatrix} \cos\vartheta_i & -\sin\vartheta_i \\ \sin\vartheta_i & \cos\vartheta_i \end{pmatrix} \quad (17)$$

In particular, by means of the first and second rotation matrices (17) it is possible to express, in a manner which is in itself known, the basic electromagnetic field as per equation (16), related to the second reference system x'y'z', in the first reference system xyz; in connection with this, the first reference system xyz is arranged with respect to the plate 4 as shown in FIG. 3, i.e. so that the z-axis is parallel to two diametrically opposite slots.

By summing the basic electromagnetic fields emitted by all the N slots 6, it is therefore possible to obtain the second electromagnetic field $E_2$, with regard to the first reference system xyz.

Referring, for motives of simplicity and without any loss of generality, to the case where d=0, namely the case (not shown) where the slots are balanced, it is found that $\varphi$ is null and that the second reference system x',y',z', related to a single slot 6, coincides with the first reference system xyz. In addition, each basic electromagnetic field locally has the same direction as the balanced slot that emitted it. In practice, adopting an index i to identify the slots and indicating the azimuth coordinate of the i-th balanced slot as $\theta_i$, i.e. the angle formed by the i-th balanced slot, and in particular by the corresponding slot axis A with the z-axis, the basic electromagnetic field emitted by the i-th balanced slot is equal to:

$$E_{Fi}(x', y', z', \theta_i) = \qquad (18)$$

$$\frac{2e^{ik_0\left(x' + \frac{y'^2 + z'^2}{2x'}\right) + i\frac{k_{sp}d}{2}}}{i\lambda x'} \cos\left(\frac{\pi y' a}{\lambda x'} - \frac{k_{sp}d}{2}\right)(\hat{y}\cos\theta_i + \hat{z}\sin\theta_i)$$

By writing the polarization vector represented by the last term of equation (18) in a cylindrical coordinate system having the origin lying along the symmetry axis H of the plate 4, it is found that the polarization vector is headed along the azimuthal direction $\hat{\theta}$. In addition, by considering the rotation of the second reference system x'y'z' with respect to the first reference system xyz, and summing the basic electromagnetic fields emitted by the balanced slots, which are all headed along the same azimuthal direction, the following is obtained:

$$E_T(x, y, z) = \sum_{i=1}^{N} E_{Fi}(x, y, z, \theta_i) = \sum_{i=1}^{N} E_{Fi}(x, y, z, \theta_i)\hat{\theta} \qquad (19)$$

where $E_T$ is nothing other than the above-mentioned second electromagnetic field $E_2$ in the case of balanced slots. In practice, the above-mentioned second electromagnetic field $E_2$ is not circularly, but azimuthally polarized. In addition, it is possible to verify that the Poynting vector of the second electromagnetic field $E_2$ has a transverse component that rotates around the symmetry axis H. In other words, the plate 4 imparts a helical phase on the second electromagnetic field $E_2$, with the consequent generation of an optical vortex with a unitary topological charge and wrapped around the symmetry axis H. In greater detail, with regard to the second electromagnetic field $E_2$, each photon is devoid of spin angular momentum, but possesses an orbital angular momentum equal to $\pm\hbar$, depending on the direction of circular polarization of the first electromagnetic field $E_1$.

With regard to the case of the slots 6, or rather the case of the imbalanced slots, it is found that each photon of the second electromagnetic field $E_2$ is, in any case, devoid of spin angular momentum and possesses an orbital angular momentum equal to $\pm\hbar$. In addition, it is possible to determine the second electromagnetic field $E_2$ by modelling each slot as an electric dipole arranged along the direction that connects the first and second dot-like sources SP1, SP2 (FIG. 5), and by assuming that each slot 6 extends infinitely along the z-axis. Each slot 6 can thus be modelled as a linear distribution of oscillating electric dipoles having a radiation pattern inclined with respect to the first and second slot surfaces 12, 14.

In the far-field regime, the electric field associated with the basic electromagnetic field emitted by a single slot 6 is still headed along the azimuthal direction $\hat{\theta}$, and the cylindrical coordinates assume the form:

$$E = \frac{1}{4\omega\varepsilon_0}\sqrt{\frac{k_0^3}{r}} e^{ik_0 r} p_z \sin\theta \, \hat{\theta} \qquad (20)$$

where $p_z$ is the dipole moment along direction z, $\omega$ is the pulse of the first and second electromagnetic fields $E_1$, $E_2$, $\varepsilon_0$ is the electric constant and r is a radial coordinate.

The corresponding Poynting vector is therefore equal to:

$$\Pi \cong \frac{\mu_0}{16}|p_z|^2\frac{\omega}{r}\sin^2\theta \tag{21}$$

where $\mu_0$ is the magnetic permeability in a vacuum

It is therefore possible to numerically determine the second electromagnetic field $E_2$, by integration of the contributions of the N linear distributions of electric dipoles.

It should also be noted that, in the case of the slots 6, or rather in the case of imbalanced slots, the basic electromagnetic field emitted by each slot 6 is inclined with respect to the first and second slot surfaces 12, 14. In other words, the Poynting vector is inclined with respect to the first and second slot surfaces 12, 14, and so has an appreciable horizontal component (parallel to the lower plane $S_2$). Thus, due to this basic electromagnetic field, the plate 4 is subjected to a force, which has the same direction as the Poynting vector and opposite sign. In addition, owing to the azimuthal distribution of the slots 6, an overall torque C acts on the plate 4, which can be expressed as:

$$C = N\int_0^{R_{max}} \frac{m(h)}{c}d|H_0(r)|^2 r dr \tag{22}$$

where c indicates the speed of light in a vacuum, $H_0$ is the magnetic field generated by a single slot, $R_{max}$ is the maximum radius of the plate 4 (namely D+cr), and m(h) is the transmission coefficient of a single slot.

Figure 6:
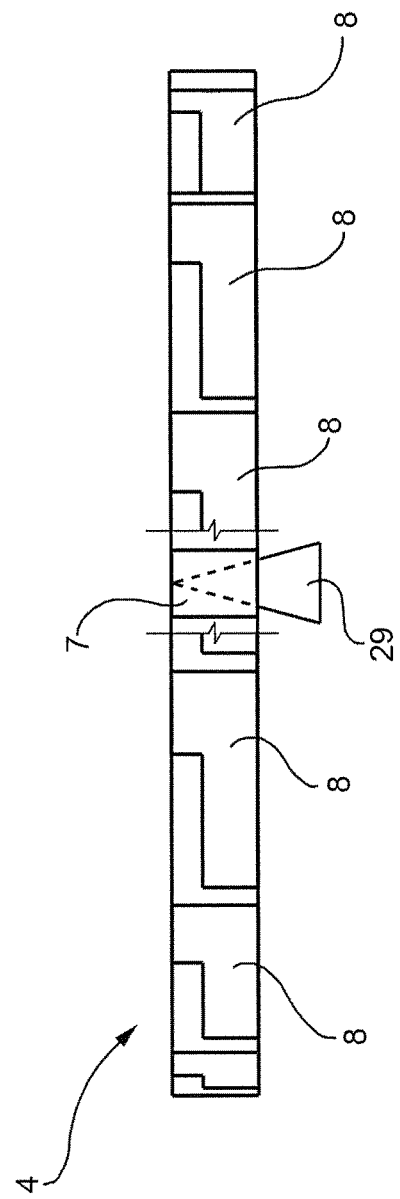
FIG. 6 schematically shows a lateral view of a pivot and a plasmonic plate according to the present invention.

Due to the above-mentioned torque, the plate 4 can be placed in rotation if arranged, for example, in suspension in a fluid (not shown) Similarly, the plate 4 can be placed in rotation if, as shown in FIG. 6, the central shield 7 has a hollow shape and couples in a rotatable manner with a pivot 29.

In general, the moment of inertia I of the plate 4 is equal to:

$$I = \frac{\pi}{2}\left(\frac{d}{2}+h\right)R_{max}^4 \rho \tag{23}$$

where $\rho$ is the mass density per unit volume of the metal that forms the plate 4 and h is height $h_9$. It thus results that the plate 4 is subjected to an angular acceleration equal to:

$$\alpha = \frac{C}{I} \tag{24}$$

The plate 4 thus forms a rotating device that can be operated electromagnetically, which is useful, for example, to make an electromagnetically operated gear, or to generate heat, if immersed in a fluid.

Purely by way of example, details are provided below regarding a possible embodiment, in which the plate 4 is made of silver and where $h_9$=200 nm, $h_{10}$=350 nm, d=150 nm and g=350 nm; in addition, the first electromagnetic field $E_1$ has a wavelength $\lambda$ equal to 800 nm, i.e. greater than the thickness g of the slots 6.

Figure 7:
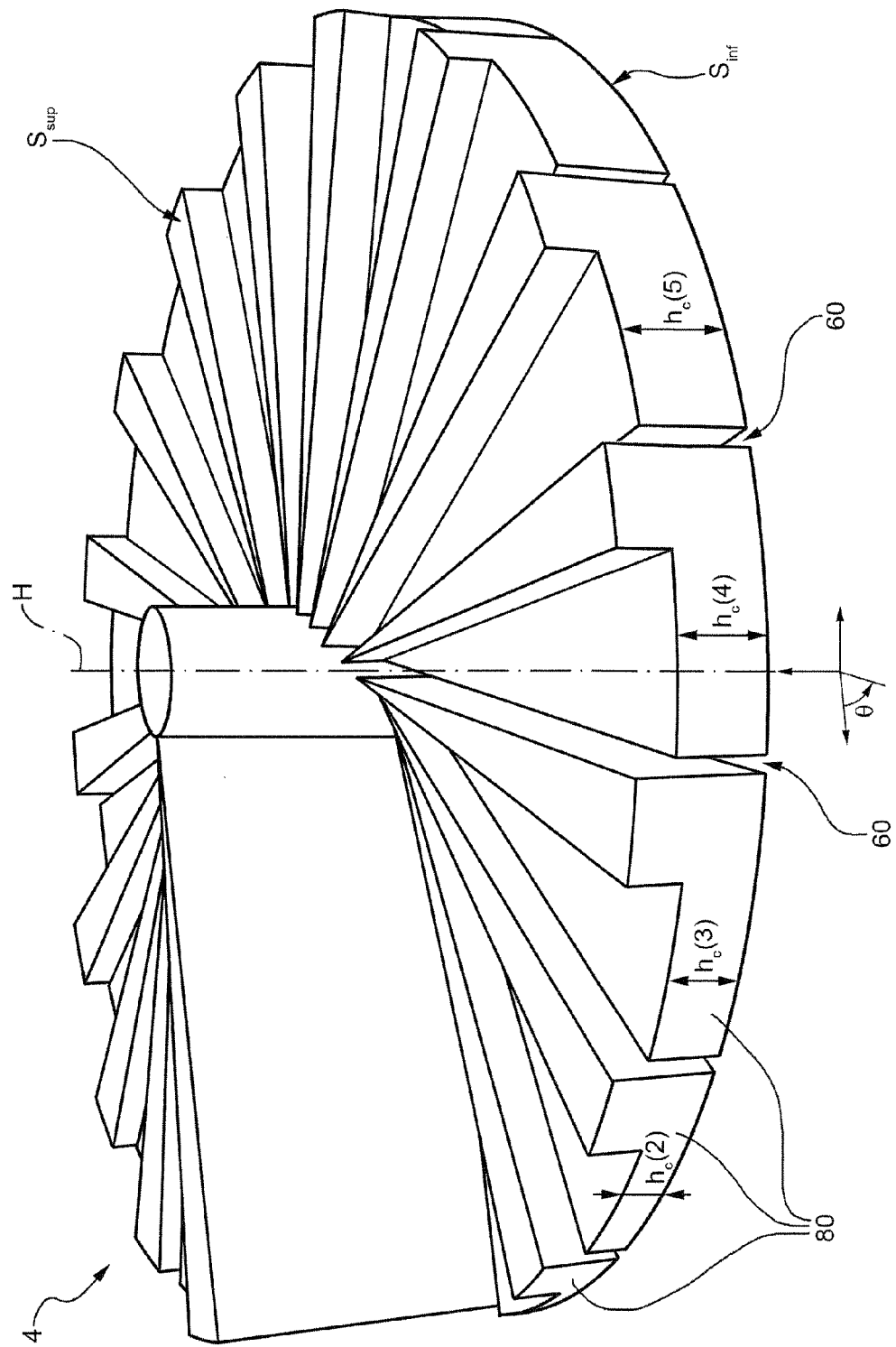
FIG. 7 shows a perspective view of a variant of the plasmonic plate shown in FIGS. 2 and 3.

However, as shown in FIG. 7, further embodiments are possible, where the plate 4 is such that the elementary units (indicated here by reference numeral 80), and therefore the slots (indicated here by reference numeral 60), are imbalanced, but not identical to one another. More precisely, considering a generic slot 60, it is possible to indicate a lower depth of the slot considered as $h_c$, equal to the height of the respective second slot surface. In addition, it is possible to position the above-mentioned cylindrical reference system such that the slots 60, all of which have the same width g, have lower depths $h_c$ that proportionally increase, preferably in a linear manner, with the azimuth coordinates $\theta_j$ of the slots 60. By way of example, FIG. 7 shows the lower depths $h_c(2)$, $h_c(3)$, $h_c(4)$ and $h_c(5)$ of four successive slots, having indices j=2, 3, 4 and 5; the slot 60 identified by j=1 has the minimum lower depth. Furthermore, the slots 60 all have the same difference in height d, except for the slot 60 identified by j=1; this means that, except for the slot identified by j=1, the heights of the first slot surfaces 12 and the second slot surfaces 14 of the other slots 60 grow azimuthally according to the same law.

By means of the embodiment shown in FIG. 7, it is possible to obtain a non-unitary topological charge; in fact, $Q=H_{tot}/\lambda$, where $H_{tot}$ indicates the maximum height difference between any two points of the corrugated surface $S_{sup}$ of the plate 4, equivalent to the difference in height of the slot identified by j=1. If necessary, it is still possible to have d=0, i.e. to have slots 60 that are balanced.

Figure 8:
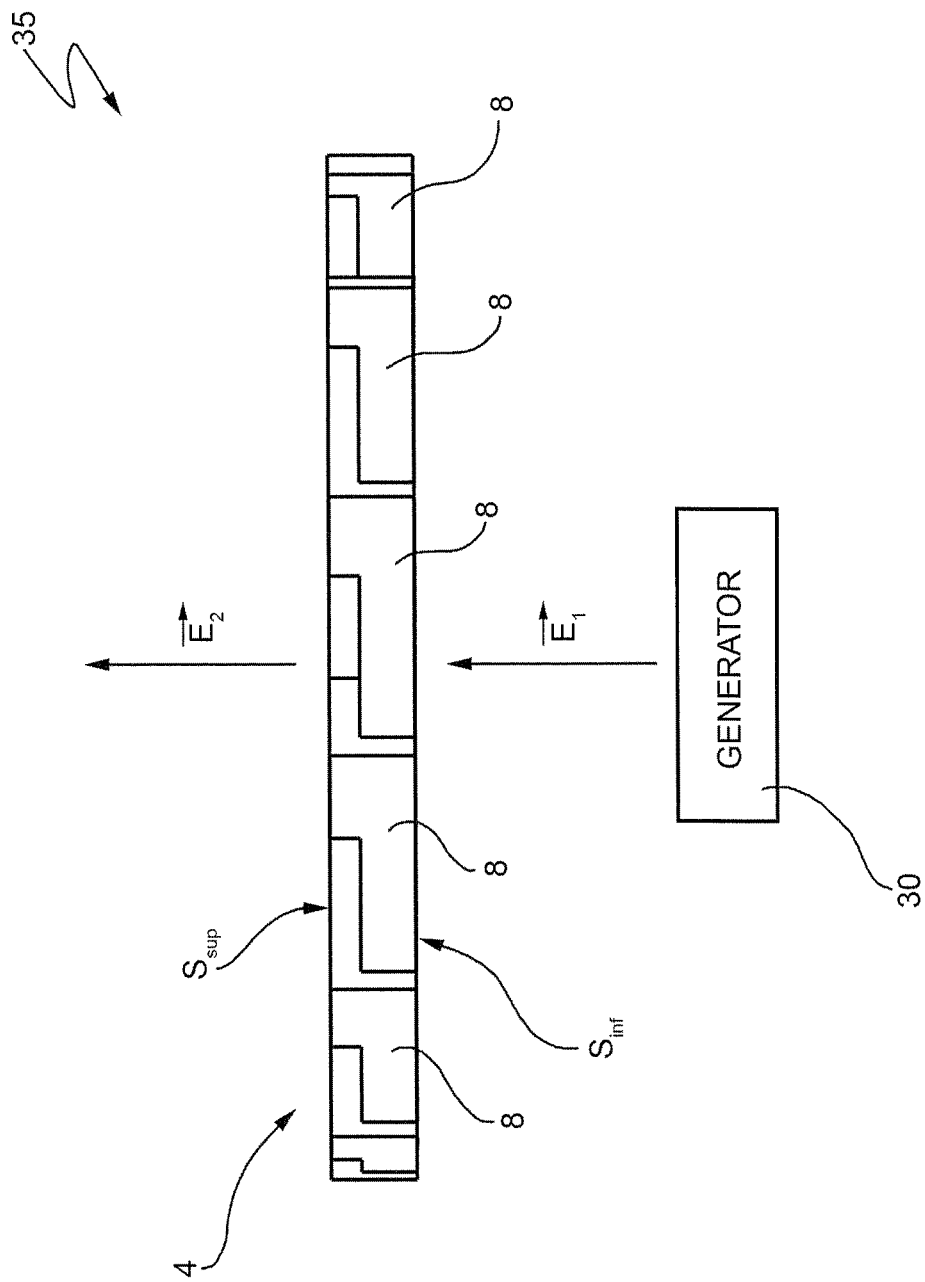
FIG. 8 shows a block diagram of a plasmon generator including the plasmonic plate shown in FIGS. 2 and 3.

As shown in FIG. 8, where reference is made, by way of example and without loss of generality, to the plasmonic plate shown in FIGS. 2 and 3, it is also possible to make use of an electromagnetic field generator 30, which is suitable for generating the first electromagnetic field $E_1$, as well as directing it towards the flat surface $S_{inf}$ of the plate 4, i.e. towards the lower surfaces $S_8$ of the elementary units 8. The electromagnetic field generator 30 and the plate 4 thus form a plasmon generator of optical vortices 35, which is suitable for generating an electromagnetic field having non-null orbital angular momentum; such a field is precisely formed by the second electromagnetic field $E_2$, which propagates starting from a second side of the plate 4, opposite to the abovementioned first side, moving away from the plate 4. Therefore, the second electromagnetic field $E_2$ propagates, starting from the second side of the plate 4, outwards, instead than towards the first side.

In order to render the modelling of the slots with the abovementioned dipoles as accurate as possible, it is advisable that the wavelength $\lambda$ of the first electromagnetic field $E_1$ is greater than four times, and preferably greater than ten times, the width g of the slots 6. Otherwise, the coupling between the surface plasmons that propagate long the walls of the single slots will not actually take place.

From the foregoing description, the advantages that can be achieved with the present plasmonic plate, operating in transmission, emerge clearly. In particular, they permit converting the spin angular momentum of the first electromagnetic field $E_1$ into the orbital angular momentum of the second electromagnetic field $E_2$, by means of a discretization of the levels that form a hypothetical helical ramp of a phase profile, without making use of a large-sized plastic device. In practice, each slot 6 implements one of these levels, generating an opportune basic electromagnetic field. It is also possible to demonstrate that as the number N of slots grows, the phase profile of the second electromagnetic field $E_2$ tends to approximate increasingly well to a helical profile, and the modulus of the second electromagnetic field $E_2$ tends to approximate to a Laguerre-Gauss mode with a unitary azimuthal index and a null radial index.

Finally, it is clear that modifications and variations can be applied to the plasmonic plate described herein without leaving the scope of protection of the present invention.

For example, the central shield 7 might not be present. Furthermore, the first portions 9 and the second portions 10 of the elementary units 8, and consequently the elementary units 8 themselves, could have different shapes with respect to that described and illustrated herein. Similarly, when viewed from above, the plate 4 could have a different shape, such as a square shape for example.

The invention claimed is:

1. A plasmonic plate for generating optical vortices, formed by electrically conducting material, delimited by a first side and an oppositely disposed second side and defining a plurality of slots, each slot extending between the first side and the second side, the slots being configured to convert a first electromagnetic field impinging on the first side of the plasmonic plate and having a non-null spin angular momentum, into a second electromagnetic field having a non-null orbital angular momentum and propagating outwards from the second side of the plasmonic plate.

2. The plasmonic plate according to claim 1, wherein said slots are arranged about a symmetry axis, said slots being radial.

3. The plasmonic plate according to claim 2, wherein said slots are angularly and equally spaced apart.

4. The plasmonic plate according to claim 3, wherein the number of said slots is equal to N, and wherein pairs of adjacent slots are angularly spaced apart by an angle equal to $2\pi/N$.

5. The plasmonic plate according to claim 2, wherein each slot is laterally delimited by a corresponding first surface and a corresponding second surface, said first and second surfaces being flat, parallel to one another and parallel to a radial direction.

6. The plasmonic plate according to claim 5, wherein said first side is formed by a flat surface orthogonal to the symmetry axis, and wherein the first and second surfaces of each slot extend from said flat surface.

7. The plasmonic plate according to claim 6, wherein the first and the second surface of each slot have corresponding heights, measured in a direction parallel to the symmetry axis and different from each other, so that each slot is imbalanced by a difference in height equal to the difference between the heights of the respective first and second surface, all slots being equal to one another.

8. The plasmonic plate according to claim 6, wherein each slot is associated to a corresponding azimuth coordinate, and wherein the first and the second surface of each slot have corresponding heights, measured in a direction parallel to the symmetry axis; and wherein each slot has a respective lower depth, equal to the smaller of the heights of the corresponding first and second surfaces, the lower depths of the slots being directly proportional to the azimuth coordinates of the corresponding slots.

9. The plasmonic plate according to claim 8, wherein the heights of the first and of the second surface of each slot are different from each other so that each slot is imbalanced by a difference in height equal to the difference between the heights of the respective first and second surfaces, all slots having the same difference in height, except for the slot having the minimum azimuth coordinate.

10. A plasmonic generator of optical vortices, comprising a plasmonic plate according to claim 1 and an electromagnetic field generator configured to generate the first electromagnetic field so that it impinges on said plasmonic plate with a circular polarization.

11. The plasmonic generator according to claim 10, wherein said slots have a same width, and wherein said electromagnetic field generator is further configured so that the first electromagnetic field has a wavelength greater than four times the width of the slots.

12. A method for converting a first electromagnetic field having non-null spin angular momentum into a second electromagnetic field having a non-null orbital angular momentum using the plasmonic plate of claim 1.

13. A method for generating an optical vortex, comprising the steps of:
providing a plasmonic plate according to claim 1;
generating said first electromagnetic field having non-null spin angular momentum; and
causing said first electromagnetic field to impinge on said plasmonic plate.

14. The method of generation according to claim 13, wherein said slots have a same width and wherein said step of generating said first electromagnetic field generator comprises emitting said first electromagnetic field such that it has circular polarization and a wavelength greater than four times the width of the slots.

* * * * *